United States Patent
Suzuki (10) Patent No.: US 8,554,470 B2
(45) Date of Patent: Oct. 8, 2013

(54) COMMUNICATION SYSTEM AND MOVABLE TERMINAL

(75) Inventor: Takamitsu Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 13/230,964

(22) Filed: Sep. 13, 2011

(65) Prior Publication Data

US 2012/0084001 A1   Apr. 5, 2012

(30) Foreign Application Priority Data

Sep. 30, 2010   (JP) ................................. 2010-220952

(51) Int. Cl.
*G01C 21/00* (2006.01)

(52) U.S. Cl.
USPC ........... 701/409; 701/430; 701/442; 701/451; 340/995.23

(58) Field of Classification Search
USPC ................. 701/400, 409, 430, 431, 442, 451; 340/988, 995.23
See application file for complete search history.

(56) References Cited

U.S. PATENT DOCUMENTS

| | | | |
|---|---|---|---|
| 6,377,890 B1 * | 4/2002 | Doi | 701/431 |
| 6,421,606 B1 * | 7/2002 | Asai et al. | 701/410 |
| 6,700,506 B1 * | 3/2004 | Winkler et al. | 340/994 |
| 2002/0161519 A1 | 10/2002 | Mori et al. | |
| 2009/0055089 A1 * | 2/2009 | Lee et al. | 701/202 |
| 2011/0119200 A1 * | 5/2011 | Hatta | 705/335 |

FOREIGN PATENT DOCUMENTS

| | | |
|---|---|---|
| JP | A-8-166248 | 6/1996 |
| JP | B2-4485095 | 10/2002 |
| JP | A-B2-4419542 | 6/2005 |
| JP | B2-4496323 | 9/2005 |
| JP | A-2007-205946 | 8/2007 |
| JP | A-2008-304313 | 12/2008 |
| JP | A-2009-300226 | 12/2009 |
| JP | B2-4420471 | 2/2010 |
| JP | A-2010-91367 | 4/2010 |

* cited by examiner

*Primary Examiner* — Gertrude Arthur Jeanglaude
(74) *Attorney, Agent, or Firm* — Posz Law Group, PLC (57) ABSTRACT

A movable terminal stores previously a travel time schedule in a regular travel state of a public transportation. The movable terminal executes a route retrieval from candidates containing route sections traveled by using the public transportation and route sections traveled by using different transportation (i.e., foot, vehicle) other than the public transportation. As a result of the route retrieval, when it is determined that the route using the public transportation is more suitable, a request for a multi-modal retrieval based on actual present travel state of the public transportation is transmitted to a center. A center route received thereafter from the center is recorded as a guidance route used for executing route guidance.

8 Claims, 6 Drawing Sheets

COMMUNICATION SYSTEM AND MOVABLE TERMINAL

CROSS REFERENCE TO RELATED APPLICATION

The present application is based on and incorporates herein by reference Japanese Patent Application No. 2010-220952 filed on Sep. 30, 2010.

FIELD OF THE INVENTION

The present invention relates to a communication system and a movable terminal.

BACKGROUND OF THE INVENTION

[Patent Document 1] JP 2002-296070 A

Retrieval of an optimum route may be made by combining several transportation means such as foot, automobile, and public transportation (for example, train, bus) and, furthermore, by considering travel states varying over time due to road traffic congestions or delays of the public transportation. To achieve such a route retrieval, there is known a technology in which a route retrieval is calculated by a center, which easily collects all the information ideally, according to the inquiry from each movable terminal (refer to Patent document 1).

However, in practically achieving such a technology, there is a problem that the load concentrates on the center with an increase in the number of movable terminals inquiring to the center. In addition, inquiring one by one requires a communication cost each time, posing a problem.

SUMMARY OF THE INVENTION

The present invention takes the above problem into consideration.

It is an object of the present invention to provide a technology to efficiently operate a center performing a multi-modal route retrieval by minimizing a cost necessary for making an inquiry to the center in an optimum route retrieval that is made by combining several transportation means such as a vehicle and a public transportation and, furthermore, by considering travel states varying momentarily due to a road traffic congestion or a delay of the public transportation.

To achieve the above object, according to an aspect of the invention, a communication system including a movable terminal and a center that intercommunicates with the movable terminal is provided as follows. The movable terminal includes: an in-terminal storage device storing an in-terminal map database containing a road configuration and positions of getting-on-off facilities, at which to get on or off a public transportation, and a regular public transportation travel database containing a regular travel schedule in a regular travel state of the public transportation; and an in-terminal controller. The center includes: an in-center storage device storing an in-center map database containing a road configuration and positions of getting-on-off facilities, at which to get on or off the public transportation, and a present public transportation database containing the regular travel schedule of the public transportation and a present travel change state against the regular travel schedule; and an in-center controller. The in-terminal controller includes: a local multi-modal route retrieval section to calculate as an optimal route a local route from a present position to a destination from candidates of route sections traveled by the public transportation and route sections traveled by different transportation other than the public transportation with reference to the in-terminal map database and the regular public transportation travel database; a determination section to determine whether the local route calculated by the local multi-modal route retrieval section uses the public transportation; a local route record section to record the local route as a guidance route used for executing route guidance when the determination section determines that the local route does not use the public transportation; and a center multi-modal request section to transmit a multi-modal route retrieval request containing data on the present position and the destination, to the center when the determination section determines that the local route uses the public transportation. The in-center controller includes: a multi-modal route retrieval request reception section to receive the multi-modal route retrieval request transmitted by the center multi-modal request section of the movable terminal; a center multi-modal route retrieval section to calculate as an optimal route a center route from the present position to the destination indicated in the multi-modal route retrieval request, from candidates of route sections traveled by the public transportation and route sections traveled by different transportation other than the public transportation with reference to the in-center map database and the present public transportation travel database when the multi-modal route retrieval request reception section receives the multi-modal route retrieval request; and a multi-modal route distribution section to transmit data on the center route calculated by the center multi-modal route retrieval section to the movable terminal. The in-terminal controller further includes: a center route record section to record the center route as a guidance route used for executing route guidance upon receiving the data on the center route transmitted by the multi-modal route distribution section as a response to the multi-modal route retrieval request transmitted by the center multi-modal request section of the movable terminal.

Under such a configuration, the movable terminal previously stores the regular public transportation travel database containing a regular travel schedule in a regular travel state of the public transportation and executes a route retrieval from candidates containing route sections traveled by different transportation means (i.e., foot, vehicle) other than the public transportation and route sections traveled by the public transportation. When the result of the route retrieval indicates that it is more effective to use the public transportation, the request of the multi-modal retrieval with reference to the real-time actual present travel state is transmitted to the center.

It is noted that the route based on the actual travel state of the public transportation is generally at the most identical to or worsen (e.g., delayed in travel time) from the route based on the regular travel state of the public transportation. This is because the public transportation is generally operated without preceding the regular schedule. Thus, only in the case where the route based on the regular state of the public transportation is retrieved as an optimal route, the route based on the actual travel state of the public transportation can be retrieved as an optimal route. Adopting the above configuration can achieve a multi-modal retrieval without a useless unnecessary inquiry to the center.

According to another aspect of the present invention, a movable terminal is provided as the movable terminal recited in the above communication system according to the aspect of the invention.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
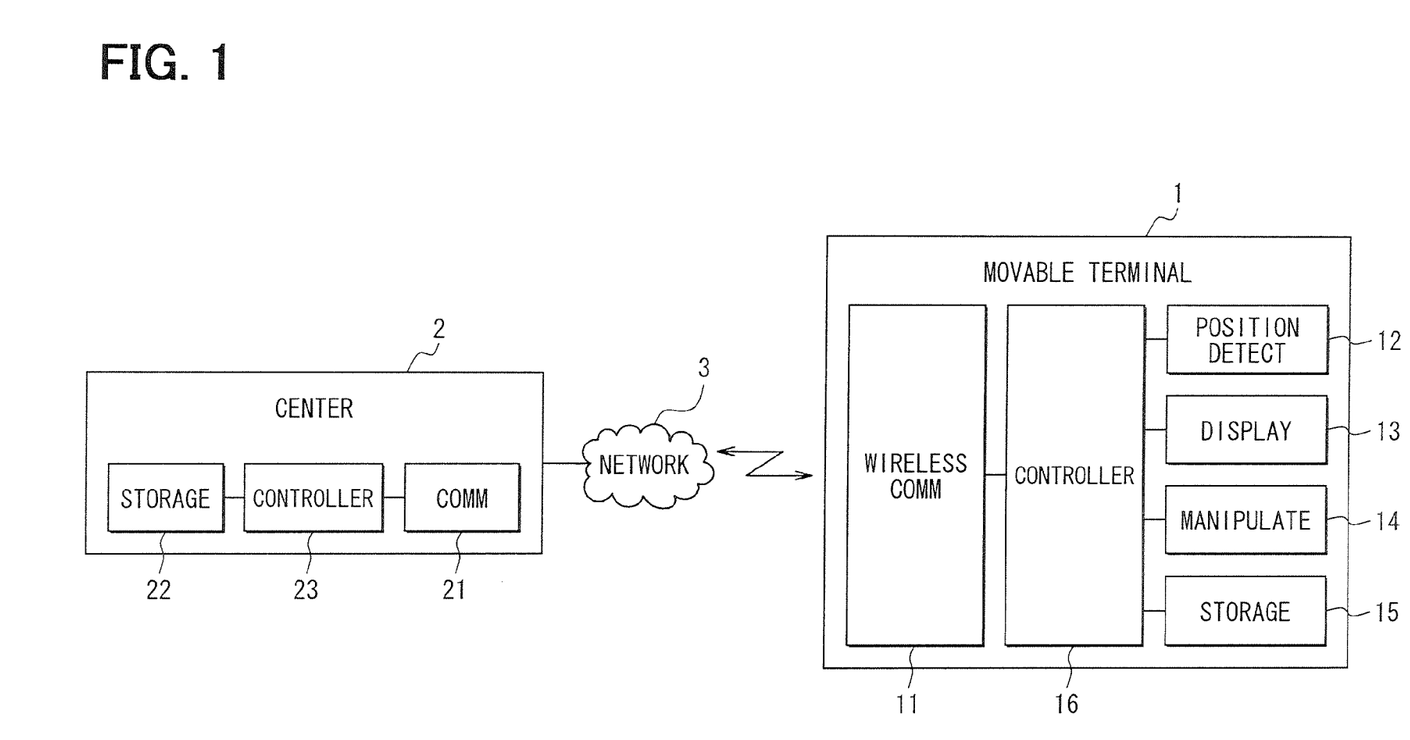
FIG. 1 is a diagram illustrating a configuration of a communication system according to embodiments of the present invention.
Figure 2:
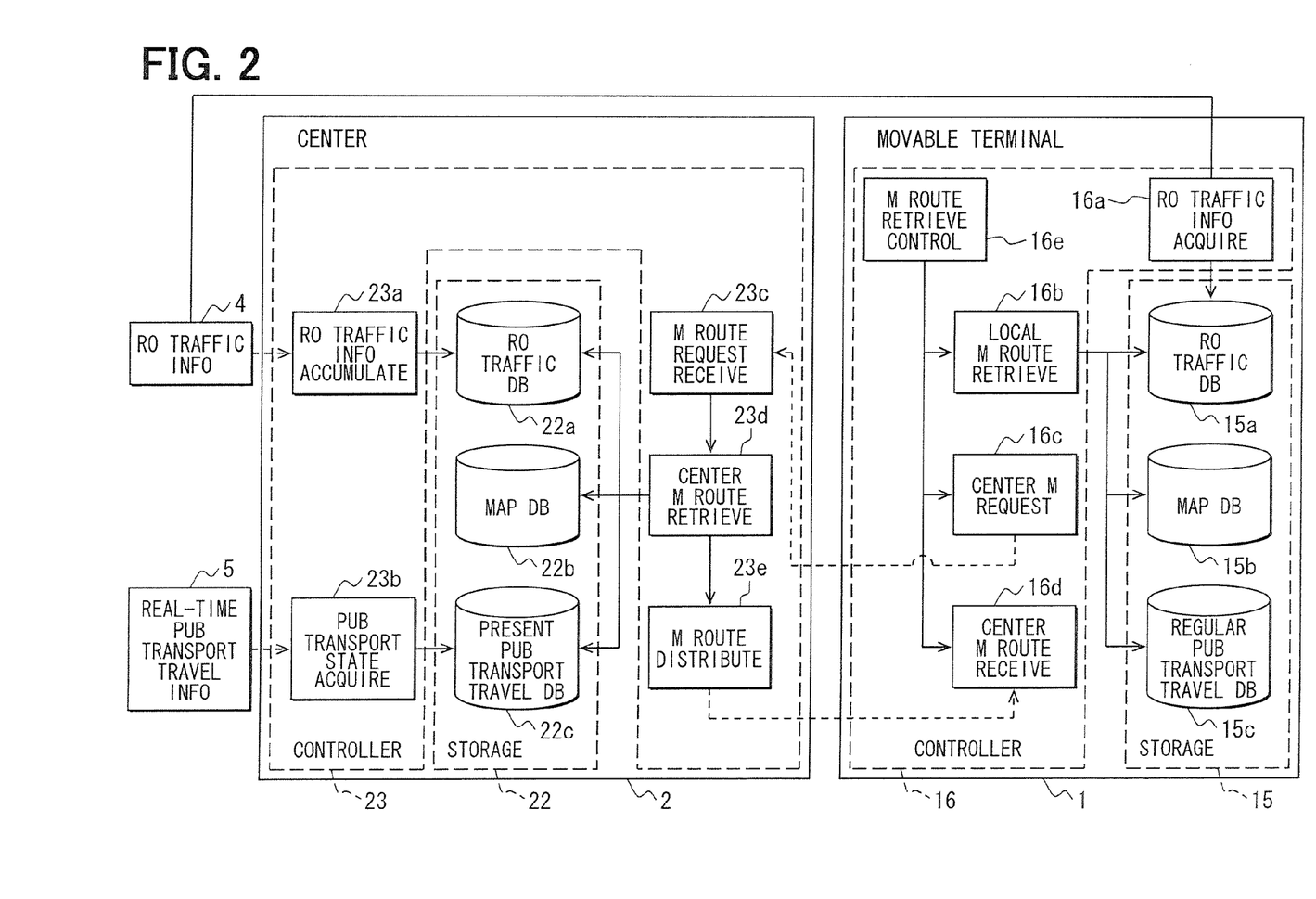
FIG. 2 is a functional block diagram illustrating a configuration of a movable terminal and a center.

The following describes a first embodiment of the present invention. FIG. 1 illustrates a configuration of a communication system according to embodiments of the present invention. FIG. 2 illustrates a functional configuration of the communication system. The communication system includes a movable terminal 1 and a center 2. The movable terminal 1 and the center 2 can intercommunicate with each other via a communication network 3 (for example, a wide area network such as the Internet).

The movable terminal 1 is a communication terminal that moves or travels to follow a user's movement or travel. The movable terminal 1 may be mounted in a subject vehicle together with the user or may be carried by the user. The center 2 may be also referred to as a center server. The center 2 is located at a position (for example, inside of a building) separate from the movable terminal 1.

This movable terminal 1 includes a wireless communication device 11, a position detection device 12, a display device 13, a manipulation device 14, an in-terminal storage device 15, and an in-terminal controller 16.

The wireless communication device 11 is a known circuit to execute amplification, frequency conversion, modulation, demodulating, etc. in order to carry out wireless connection to a communication network 3 to intercommunicate with the center 2. The following explanation is based on a premise that the in-terminal controller 16 uses the wireless communication device 11 when intercommunicating with an apparatus separate from or outside of the movable terminal 1.

The position detection device 12 detects a present position of the movable terminal 1 and outputs the detected present position to the in-terminal controller 16. When the movable terminal 1 is a navigation apparatus mounted in the subject vehicle, the position detection device 12 may be a vehicle speed sensor, a GPS receiver, or a gyro sensor. In addition, when the movable terminal 1 is a portable terminal carried by the user, the position detection device 12 may be a GPS receiver.

The display device 13 displays characters and/or images for the user. The manipulation device 14 receives a user's input manipulation (for example, a destination input manipulation), and outputs a signal responding to the received user's manipulation to the in-terminal controller 16.

The in-terminal storage device 15 includes a nonvolatile storage media such as a magnetic storage media and a flash memory, and stores a traffic information database 15a, an in-terminal map database 15b, a regular public transportation travel database 15c as illustrated in FIG. 2.

The traffic information database 15a contains data on a present road traffic congestion degree of each road. This traffic information database 15a is updated serially by a traffic information acquisition process 16a to be mentioned later.

The in-terminal map database 15b contains road data and facility data. The road data includes data on road configuration such as position and kind information on links, position and kind information on nodes, and information on connection relation of nodes and links. The facility data contains multiple records for every facility. Each record contains, with respect to a facility, name information, location information, land lot number information (called address information), facility kind information, etc. Facilities include schools, parks, convenience stores, restaurants, and getting-on-off facilities (for example, stations, bus stops, airports, and harbors) that are facilities where to get on and off the public transportation (for example, trains, buses, airplanes, and ships).

The regular public transportation travel database 15c contains data on travel schedules or timetables of regular travel states of the public transportation (for example, trains, buses, airplanes, and ships). For example, the regular public transportation travel database 15c contains, with respect to each service route of each public transportation, data on a name of the service route and data on arrival time and/or departure time at each getting-on-off facility that is a facility for getting on and off each service route of the public transportation (i.e., train, but). The getting-on-off facility includes a station for a train or tram, and a bus stop for a bus.

The in-terminal controller 16 is a microcomputer containing a CPU, RAM, ROM, flash memory, etc and achieves various processes by using the CPU executing programs stored in the ROM or flash memory.

The in-terminal controller 16 executes the processes that include, as illustrated in FIG. 2, a traffic information acquisition process 16a, a stand-alone or local multi-modal route retrieval process 16b, a center multi-modal request process 16c, a center multi-modal route reception process 16d, and a multi-modal route retrieval control process 16e.

The traffic information acquisition process 16a is to receive traffic information on present road traffic congestion degrees of roads from an apparatus (for example, traffic information transmitter such as a VICS (Vehicle Information Communication System) transmitter) outside of the movable terminal 1, and to record the received present road traffic congestion degrees by overwriting the traffic information database 15a. The in-terminal controller 16 repeatedly executes the traffic information acquisition process 16a with predetermined time intervals (e.g., one time per one minute).

The local multi-modal route retrieval process 16b is to use the traffic information database 15a, the in-terminal map database 15b, and the regular public transportation travel database 15c without using a center multi-modal route retrieval process of the center 2 and to calculate an optimal route from a present position to a destination by selecting from candidates containing route sections traveled on foot, route sections traveled by a vehicle, and route sections traveled by a public transportation. The optimal route calculated by the local multi-modal route retrieval process 16b is referred to as a local route.

In specific, in the local multi-modal route retrieval process 16b, an optimal route is retrieved by selecting from road links in the in-terminal map database 15b and sections between the adjoining getting-on-off facilities in the regular public transportation travel database 15c. The road link corresponds to a route section traveled on foot or by a vehicle; the section between the adjoining getting-on-off facilities corresponds to a route section traveled by a public transportation. An algorithm to determine a route section includes, for instance, the Dijkstra method and A algorithm to compare costs of several routes and retrieve a route providing the smallest cost as an optimal route. The cost of each route section may be evaluated by one of three parameters of a length (namely, travel distance), a travel time, and a fee (which is imposed when passing through the route section such as a train fee), or may be a value calculated from three parameters such as an expression of $k1 \times length + k2 \times travel\ time + k3 \times fee$, wherein k1, k2, and k3 are predetermined constant values).

The local route calculated by such local multi-modal route retrieval process 16b may include, depending on a present position and a destination, a route that is traveled completely by vehicle, a route that is a combination of a route section traveled by vehicle and a route section traveled by train, and a route that is a combination of a route section traveled by vehicle, a route section traveled by train, and a route section traveled on foot.

The center multi-modal request process 16c is to transmit a multi-modal route retrieval request containing data on the present position and destination to the center 2 to request for calculating an optimal combination (center route) from the present position to the destination containing route sections traveled on foot, route sections traveled by vehicle, and route sections traveled by public transportation.

The center multi-modal route reception process 16d is to receive an optimal route calculated by the center 2 as a response to the multi-modal route retrieval request which was transmitted by the center multi-modal request process 16c.

The multi-modal route retrieval control process 16e is to execute controls of the local multi-modal route retrieval process 16b, the center multi-modal request process 16c, and the center multi-modal route reception process 16d. The detailed content of the multi-modal route retrieval control process 16e will be mentioned later.

The center 2 includes a communication device 21, an in-center storage device 22, and an in-center controller 23 as illustrated in FIG. 1. The communication device 21 is a known circuit to execute amplification, frequency conversion, modulation, demodulating, etc. in order to carry out a communication with the movable terminal 1 via the communication network 3. The following explanation is based on a premise that the in-center controller 23 uses the communication device 21 when intercommunicating with an apparatus separate from or outside of the center 2.

The in-center storage device 22 stores a traffic information database 22a, an in-center map database 22b, and a present public transportation travel database 22c as illustrated in FIG. 2.

The traffic information database 22a contains data on a present road traffic congestion degree of each road. This traffic information database 22a is updated serially by a traffic information accumulation process 23a to be mentioned later.

The center map database 22b contains road data and facility data similar to those of the in-terminal map database 15b of the movable terminal 1. The in-center map database 22b stores road configuration and positions of getting-on-off facilities (e.g., stations, bus stops, parking lots, and harbors) of public transportations, like the in-terminal map database 15b.

The present public transportation travel database 22c contains data on regular travel schedules in regular travel states of the public transportation and travel change data that is data on actual present travel change against the regular travel schedules (e.g., no change, a delay of 15 minutes, closed). The data on the regular travel schedules of the public transportation may be identical to the regular public transportation travel database 15c of the movable terminal 1.

The travel change data may include, for example, data which identifies a specific service of a route of a target public transportation, and data which indicates what a delay duration or time of a delay arises in the specific service and at which getting-on-off facility the delay arises. In addition, the travel change data may include, for example, data which identifies a specific service of a route of a target public transportation, and data which indicates that the specific service be cancelled. The travel change data is updated serially by the public transportation travel state acquisition process 23b to be mentioned later.

The in-center controller 23 is a microcomputer containing a CPU, RAM, ROM, flash memory, etc. and achieves various processes by using the CPU executing programs stored in the ROM or flash memory.

The processes executed by the in-center controller 23 include a traffic information accumulation process 23a, a public transportation travel state acquisition process 23b, a multi-modal route retrieval request reception process 23c, a center multi-modal route retrieval process 23d, and a multi-modal route distribution process 23e, as illustrated in FIG. 2.

The traffic information accumulation process 23a is to receive traffic information on present road traffic congestion degrees of roads from a road traffic information source 4 (for example, an FM-VICS (Vehicle Information Communication System) transmitter) separate from or outside of the center 2, and to record the received present road traffic congestion degrees by overwriting the traffic information database 22a. The in-center controller 23 repeatedly executes the traffic information accumulation process 23a with predetermined time intervals (e.g., one time per one minute).

The public transportation travel state acquisition process 23b is to receive data on actual present travel change from a real-time public transportation travel information source 5 separate from or outside of the center 2, and to record the received data on actual present travel change in the present public transportation travel database 22c. The real-time public transportation travel information source may include, for example, several travel change data servers arranged respectively at each consortium of public transportation facilities to transmit serially the newest travel change data about the public transportation facilities operated by each consortium. The in-center controller 23 repeatedly executes the public transportation travel state acquisition process 23b with predetermined time intervals (e.g., one time per one minute). It is noted that the travel change data which was received before more than a predetermined time (e.g., one hour) may be deleted or not deleted.

The multi-modal route retrieval request reception process 23c is to receive the multi-modal route retrieval request transmitted by the center multi-modal request process 16c of the in-terminal controller 16 in the movable terminal 1.

The center multi-modal route retrieval process 23d is started when the multi-modal route retrieval request reception process 23c receives the multi-modal route retrieval request. The center multi-modal route retrieval process uses the traffic information database 22a, the in-center map database 22b, and the present public transportation travel database 22c to thereby calculate an optimal route from the present position to the destination indicated by the received multi-modal route retrieval request, from candidates containing route sections traveled on foot, route sections traveled by vehicle, and route sections traveled by public transportation. The calculated optimal route is referred to as a center route.

The detailed algorithm of the center multi-modal route retrieval process 23d is identical to that of the local multi-modal route retrieval process 16b except for using the traffic information database 22a, the in-center map database 22b, and the present public transportation travel database 22c without using the traffic information database 15a, the in-terminal map database 15b, and the regular public transportation travel database 15c.

The center route calculated by the center multi-modal route retrieval process 23d is similar to the local route in that depending on a present position and a destination, a route is traveled completely by vehicle, a route is a combination of a route section traveled by vehicle and a route section traveled by train, or a route is a combination of a route section traveled by vehicle, a route section traveled by train, and a route section traveled on foot.

The multi-modal route distribution process 23e is to transmit the center route calculated by the center multi-modal route retrieval process 23d to the movable terminal 1 that originally transmitted the multi-modal route retrieval request.

Figure 3:
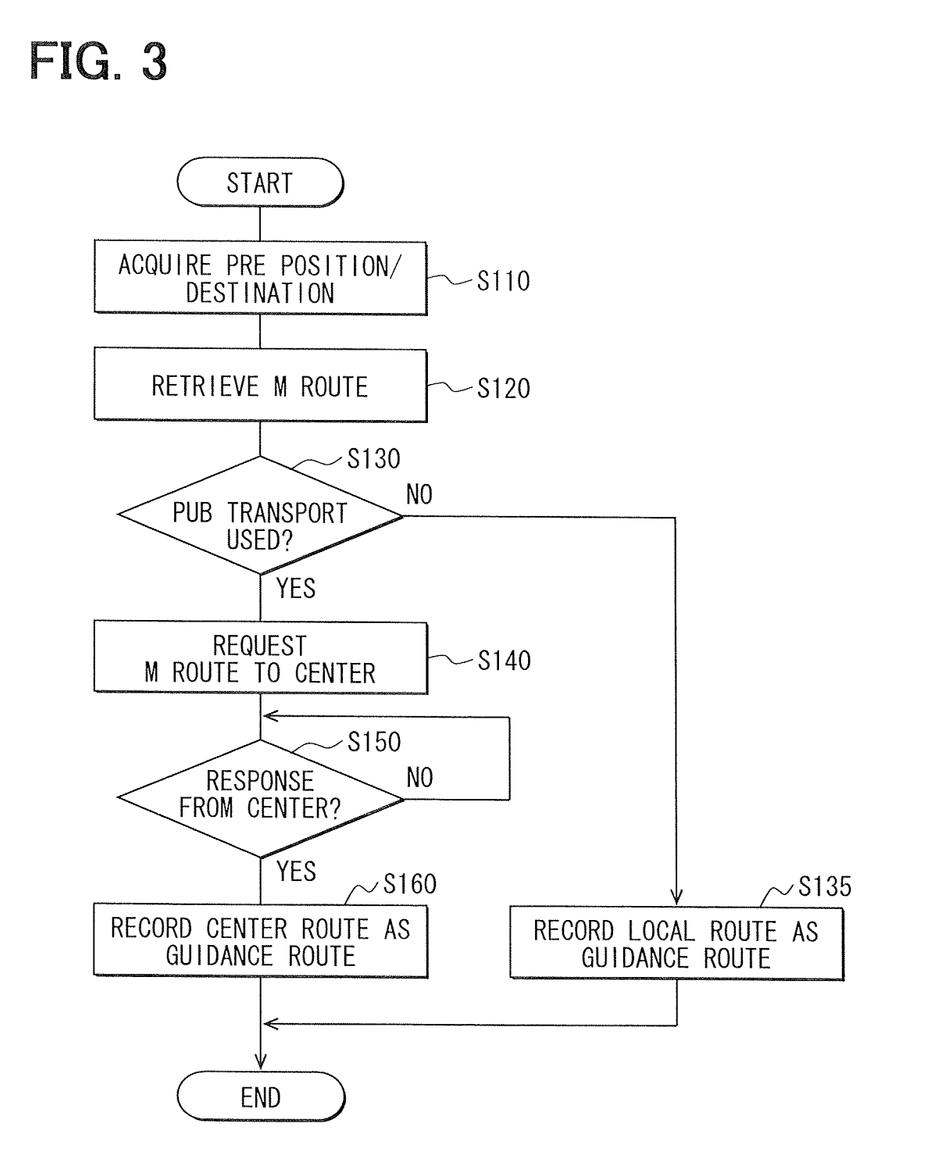
FIG. 3 is a flowchart diagram for illustrating a multi-modal route retrieval control process according to a first embodiment of the present invention.

Next, the detailed operation of the communication system of the present embodiment is explained. First, suppose that the user of the movable terminal 1 manipulates the manipulation device 14, and inputs a destination. Then, the in-terminal controller 16 starts execution of the multi-modal route retrieval control process 16e. FIG. 3 is a flowchart diagram for illustrating the multi-modal route retrieval control process 16e.

It is further noted that a flowchart or the processing of the flowchart in the present application includes sections (also referred to as steps), which are represented, for instance, as S110. Further, each section can be divided into several sub-sections while several sections can be combined into a single section. Furthermore, each of thus configured sections can be referred to as a means or module and achieved not only as a software section in combination with a hardware device but also as a hardware section. Furthermore, the software section may be included in a software program, which may be contained in a non-transitory computer-readable storage media as a program product.

In the multi-modal route retrieval control process 16e, at S110, the in-terminal controller 16 acquires the inputted destination and acquires a present position of the movable terminal 1 based on the signal from the position detection device 12. In addition to the destination, the user may input a passing point via the manipulation device 14. In such a case, the passing point is also acquired.

Then, at S120, an optimal local route from the present position to the destination, which are acquired at S110 is calculated by calling for and executing the local multi-modal route retrieval process 16b. Herein, if the passing point is acquired, the optimal local route should pass through the passing point.

The calculated local route is obtained without using the center multi-modal route retrieval process of the center 2. That is, it is obtained by using the traffic information database 15a, the in-terminal map database 15b, and the regular public transportation travel database 15c and calculating an optimal route from the present position to the destination (via a passing point if the passing point is acquired) from candidates containing route sections traveled on foot, route sections traveled by vehicle, and route sections traveled by public transportation.

Then, at S130, it is determined whether the calculated local route uses the public transportation (that is, whether the route section using public transportation is included). When it is determined that the public transportation is not used, the processing proceeds to S135; in contrast, when it is determined that the public transportation is used, the processing proceeds to S140.

At S135, the local route calculated at S120 is recorded as a guidance route used for executing route guidance. The multi-modal route retrieval control process 16e is then ended. Thereafter, a well-known route guidance is made along the local route recorded as a guidance route.

At S140, the center multi-modal request process 16c is called for and executed to thereby transmit a multi-modal route retrieval request containing data on the present position and the destination (if a passing point is acquired, data on the passing point is also contained) to the center 2. Then, at S150, the processing waits until a time of receiving from the center 2 a response to the multi-modal route retrieval request.

In contrast, in the center 2, the in-center controller 23 executes the multi-modal route retrieval request reception process 23c to receive the multi-modal route retrieval request transmitted at S140 from the movable terminal 1.

Furthermore, when receiving the multi-modal route retrieval request by the multi-modal route retrieval request reception process 23c, the in-center controller 23 executes the center multi-modal route retrieval process 23d. That is, the traffic information database 22a, the in-center map database 22b, and the present public transportation travel database 22c (data on travel schedules in a regular travel state and the travel change data) are used for finding candidates containing route sections traveled on foot, route sections traveled by vehicle, and route sections traveled by public transportation, thereby calculating an optimal route a center route from the present position to the destination indicated by the received multi-modal route retrieval request (if a passing point is received, the optimal route should pass through the passing point). Thus, since the center route is calculated by also using the travel change data, it is thought that the actual present travel state of the public transportation is reflected on the center route more accurately as compared with the local route calculated in the movable terminal 1. Then, the in-center controller 23 transmits the center route calculated by the center multi-modal route retrieval process 23d to the movable terminal 1 that originally transmitted the multi-modal route retrieval request.

Thus, upon receiving the multi-modal route retrieval request, the center 2 uses the traffic information database 22a, the in-center map database 22b, and the present public transportation travel database 22c for finding candidates containing route sections traveled without using public transportation and route sections traveled by using the public transportation, thereby calculating an optimal route a center route from the present position to the destination indicated by the received multi-modal route retrieval request and transmitting the calculated center route to the movable terminal 1. The transmitted center route is data containing route sections (e.g., the list of link IDs) included in the center route, transportation means for each route section, travel time for each route section, a travel fee for each route section.

Then, in the in-terminal controller 16 of the movable terminal 1, the center multi-modal route reception process 16d receives the center route calculated in the center 2 as a response to the multi-modal route retrieval request. Then, at S150 in FIG. 3, it is determined that the center route is received as a response to the multi-modal route retrieval request, thereby advancing the processing to S160.

At S160, the received center route is recorded as a guidance route used for executing route guidance, and the multi-modal route retrieval control process 16e is ended. Thereafter, a well-known route guidance is made along the center route recorded as a guidance route.

Thus, the movable terminal 1 is previously provided with the regular public transportation travel database 15c which contains the travel schedule under the regular travel state of the public transportation, thereby executing a route retrieval to find an optimal route from candidates containing route sections traveled by using different transportation (i.e., foot, vehicle) other than the public transportation and the route sections traveled by using the public transportation. When it is then determined as a result of the route retrieval that the route using the public transportation is more suitable, a request for the multi-modal retrieval based on the actual present travel state is transmitted to the center 2.

In comparison of the routes using the public transportation, the route based on the actual travel state may be identical to the route based on the regular travel state or be worsen from the route based on the regular travel state. Thus, only in the case where the route based on the regular state of the public transportation is retrieved as an optimal route, the route based on the actual travel state of the public transportation can be again retrieved as an optimal route. Adopting the above configuration can achieve a multi-modal retrieval without a useless unnecessary inquiry to the center 2.

Second Embodiment

The following describes a second embodiment of the present invention. The present embodiment adds the following processes in the in-terminal controller 16 and the in-center controller 23 as compared with the first embodiment.

Figure 4:
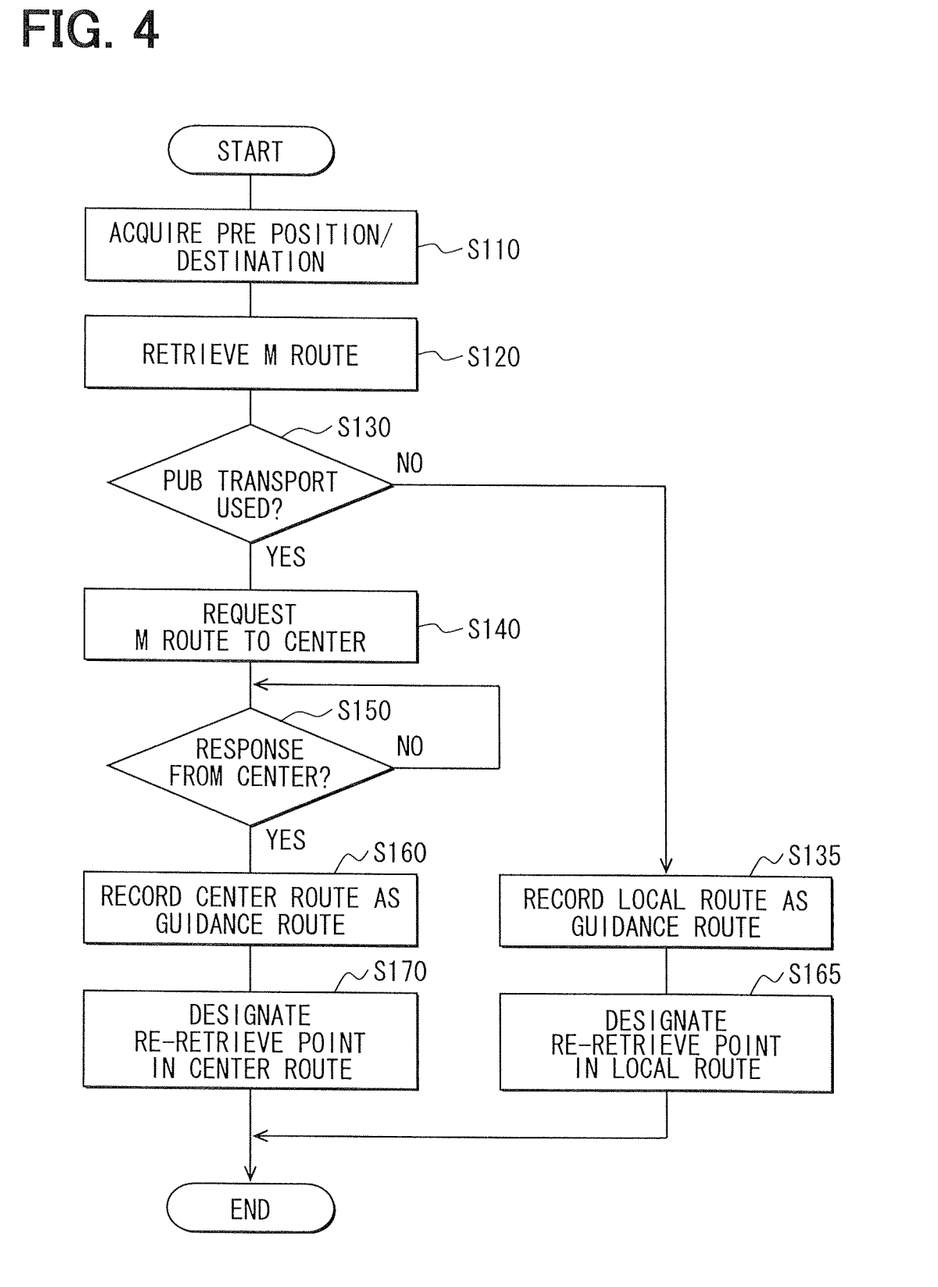
FIG. 4 is a flowchart diagram for illustrating a multi-modal route retrieval control process according to a second embodiment of the present invention.

First, the multi-modal route retrieval control process 16e in the present embodiment replaces FIG. 3 with FIG. 4. The processing at S110 to S160 is identical between FIG. 3 and FIG. 4. However, in FIG. 4, S165 is executed subsequent to S135 while S170 is executed subsequent to S160.

At S165, one or more re-retrieval points are designated on the local route presently being the guidance route and stored in the RAM or flash memory in association with the local route.

Each re-retrieval point is one point on the local route determined to be the guidance route and stored at S135, and is a point being a branching point to a different route from the local route in calculating the local route. In detail, the in-terminal controller 16 also calculates the costs of other different routes in calculating the local route at S120 as already explained. After determining the local route as the guidance route by executing S135, the in-terminal controller 16 extracts all different routes (also referred to as branching and merging routes) at S165. Each of the different routes is to branch from the local route at a branching point and merge to the local route again at a merging point.

An increase cost is calculated with respect to each of the extracted different routes. The calculation method of the increase cost of a certain different route is as follows. First, the point that branches from the local route to the certain different route is designated as a branching point A; the point that merges from the certain different route into the local route is designated as a merging point B. The cost C1 of the route section on the local route from the branching point A to the merging point B is calculated. The cost C2 of the route section on the certain different route from the branching point A to the merging point B is calculated. An increase cost (i.e., cost difference) of the cost C2 against the cost C1 is designated as an increase cost of the certain different route.

Out of the extracted different routes, a different route having an increase cost smaller than a predetermined threshold value is selected. The branch point A in the selected different route is designated as a re-retrieval point.

Further, the need for the movable terminal 1 to transmit a multi-modal route retrieval request to the center 2 arises when there is a possibility of using public transportation. Therefore, after different routes each having an increase cost smaller than a predetermined threshold value are selected from the extracted different routes, a different route including a route section traveled using public transportation is selected from the further selected different routes. The branch point A in the further selected different route may be designated as a re-retrieval point. Thus, the number of the multi-modal route retrieval requests transmitted to the center 2 can be further reduced. After S165, the process in FIG. 4 is ended.

The above-selected re-retrieval point may include, for instance, a branching point of the road which the user reaches after traveling almost the same distance even if taking either the local route or the branching and merging route (i.e., different route); a transfer station (i.e., a getting-on-off facility) which the user reaches after almost the same time duration even if taking either the local route or the branching and merging route; and a transfer station (i.e., a getting-on-off facility) which the user reaches after almost the same time duration even if taking either the local route by vehicle or the branching and merging route by train that is changed from the vehicle.

In addition, according to the second embodiment, while calculating the center route in the multi-modal route retrieval process 23d by using the method mentioned in the first embodiment, the in-center controller 23 then designates one or more re-retrieval points on the calculated center route and stored in the RAM or flash memory in association with the center route. The method of designating the re-retrieval point is the same as that of designating the re-retrieval point on the local route being the guidance route in the in-terminal controller 16.

In addition, in the multi-modal route distribution process 23e, when transmitting the center route to the movable terminal 1, the in-center controller 23 also transmits information on a position of a re-retrieval point on the center route to the movable terminals 1. At S150, the in-terminal controller 16 receives the information on the position of the re-retrieval point along with the center route. At S160, the in-terminal controller 16 stores the received center route as a guidance route used for executing route guidance. At S170, the in-terminal controller 16 designates the received position of the re-retrieval point as the re-retrieval point of the center route and stores in a storage media such as RAM. Thus, the in-terminal controller 16 can also designate the re-retrieval point on the center route by receiving it from the center 2. After S170, the process in FIG. 4 is ended.

Figure 5:
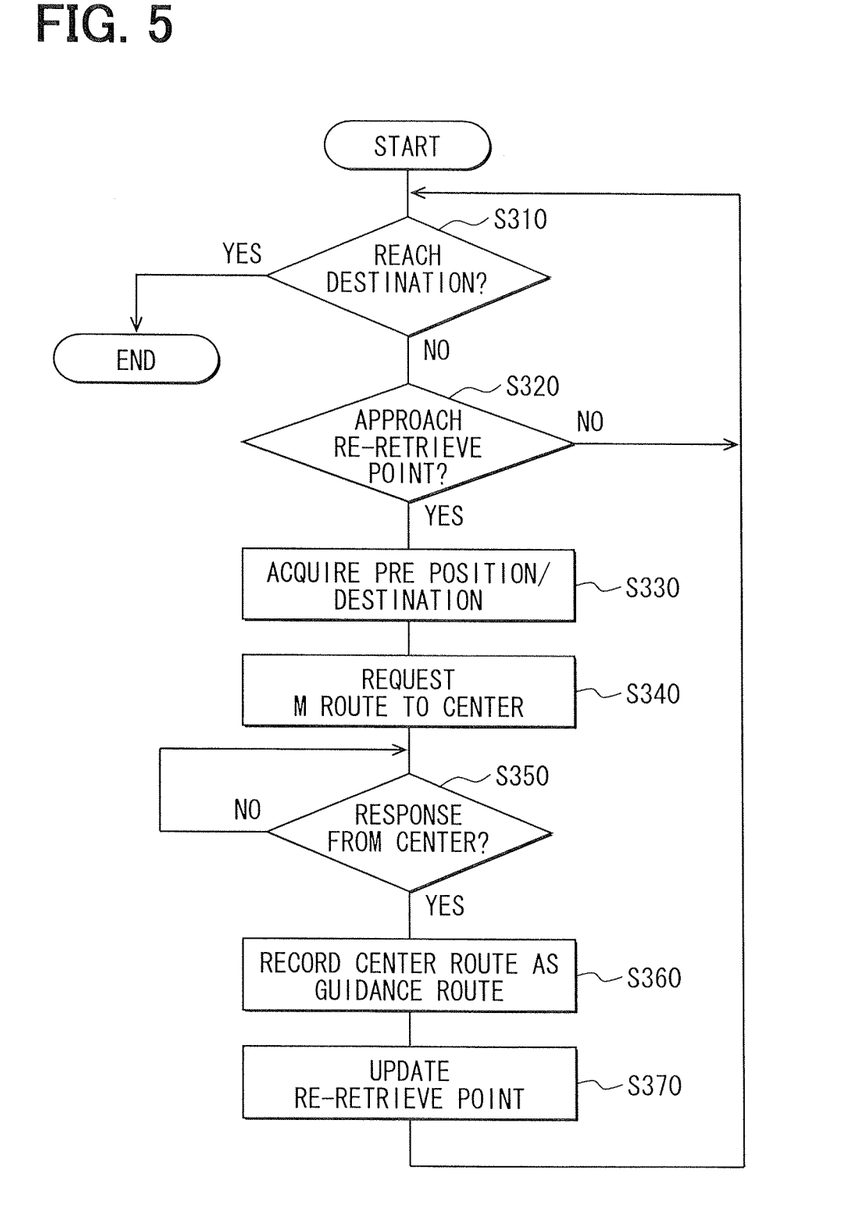
FIG. 5 is a flowchart diagram for illustrating an in-travel process executed by an in-terminal controller according to the second embodiment.

In addition, when the movable terminal 1 is traveling or moving and the in-terminal controller 16 guides the user along the above local route or the center route, whichever is determined as a guidance route used for executing route guidance, the in-travel process is executed as FIG. 5.

In the in-travel process, the in-terminal controller 16 repeats the processing until the determination at either S310 or S320 is affirmed (YES). The determination at S310 is as to whether the movable terminal 1 arrives at the destination. The determination at S320 is as to whether the movable terminal 1 approaches or reaches within a predetermined distance with respect to one of the re-retrieval points, which are recorded in the above, on the guidance route. Herein, the predetermined distance may be a fixed value or a value varying depending on the travel speed of the movable terminal 1.

When it is determined that the movable terminal 1 arrives at the destination at S310, the in-travel process is ended.

When it is determined at S320 that the movable terminal 1 approaches within the predetermined distance with respect to one of the re-retrieval points on the guidance route, the in-terminal controller 16 acquires a present position and a destination (along with a passing point, if present) again at S330. In specific, the destination of the present guidance route guidance is still set to be the destination; the present position of the movable terminal 1 is acquired; and if a passing point is still designated ahead of the present position of the movable terminal 1 in the present guidance route, such a passing point is still set to the passing point.

Then, at S340, like S140 of FIG. 3, the center multi-modal request process 16c is called for and executed to thereby transmit a multi-modal route retrieval request containing data on the present position and the destination (if a passing point is acquired, data on the passing point is also contained) to the center 2. Herein, the above multi-modal route retrieval request may be referred to as a re-retrieval-use multi-modal route retrieval request. Then, at S350, the processing waits until a time of receiving from the center 2 a response to the multi-modal route retrieval request.

Then, in the center 2, the in-center controller 23 executes the multi-modal route retrieval request reception process 23c to receive the (re-retrieval-point-use) multi-modal route retrieval request transmitted at S340 from the movable terminal 1.

Furthermore, upon received the multi-modal route retrieval request by the multi-modal route retrieval request reception process 23c, the in-center controller 23 executes the center multi-modal route retrieval process 23d. That is, the in-center controller 23 uses the traffic information database 22a, the in-center map database 22b, and the present public transportation travel database 22c (i.e., data on travel schedule in the regular travel state and the travel change data) to find candidates containing route sections traveled on foot, route sections traveled by vehicle, and route sections traveled by public transportation, thereby calculating an optimal route a center route from the present position to the destination indicated by the multi-modal route retrieval request (if a passing point is received, the optimal route should pass through the passing point). Herein, such an optimal route may be referred to as a re-retrieval-point-use center route. Thus, since the center route is calculated by using the travel change data, it is thought that the actual present travel state of the public transportation is reflected on the center route more accurately as compared with the local route calculated in the movable terminal 1. In addition, the above calculated center route (the re-retrieval-point-use center route) is calculated at a time later than the time when the center route received at S150 by the in-terminal controller 16 was calculated. The more recent travel state of the public transportation is thus reflected.

Then, the in-center controller 23 designates a re-retrieval point on the center route, which is calculated in the center multi-modal route retrieval process 23d, by a calculation method identical to the calculation method mentioned above. The in-center controller 23 transmits the center route and the re-retrieval point to the movable terminal 1 that is a source of the transmission of the multi-modal route retrieval request.

Then, the in-terminal controller 16 executes the center multi-modal route reception process 16d to receive the center route (also referred to as the re-retrieval-point-use center route) center route and the re-retrieval point(s) on it as a response to the above multi-modal route retrieval request. Then, at S350 in FIG. 5, it is determined that the center route is received as a response to the multi-modal route retrieval request, thereby advancing the processing to S360.

At S360, the in-terminal controller 16 records the received center route as a new guidance route used for executing route guidance, thereby replacing the guidance route used up to that time with the new guidance route.

Furthermore, at S370, the in-terminal controller 16 designates the position(s) of the received re-retrieval point(s) as the re-retrieval point(s) of the center route, and records it in a storage media such as a RAM, then returning the processing to S310 again.

As explained above, when using the local route or the center route as the guidance route (S135, S160 in FIG. 4), the in-terminal controller 16 of the movable terminal 1 designates at least one point, which is a branching point in selecting the route, and stores it together with the guidance route (S165, S170).

In contrast, the in-center controller 23 designates at least one re-retrieval point on the calculated center route in the center multi-modal route retrieval process 23d; the designated re-retrieval point along with the center route (also referred to as a re-retrieval-point-use center route) to the movable terminal 1 in the multi-modal route distribution process 23e. The in-terminal controller 16 receives the re-retrieval point and designates it as a re-retrieval point of the center route, recording or storing the re-retrieval point.

While the movable terminal 1 is traveling according to the route guidance of the guidance route, the in-terminal controller 16 transmits a multi-modal route retrieval request to the center 2 again when determining that the movable terminal 1 approaches the re-retrieval point. Thereby, the movable terminal 1 can use as the guidance route the center route that is prepared based on the newest travel state of the public transportation.

For example, suppose a case where the movable terminal 1 adopts originally or initially a route containing the following: a route section up to a branching point A traveled on foot; and a route section from the branching point A to the merging point B traveled by train. Here, the route section from the branching point A to the merging point B may be traveled by vehicle. While the route section from the branching point A to the merging point B may be thus traveled either by vehicle or by train, the route section traveled by train is cheaper than that by train. Thus, the center route using the route section traveled by train is resultantly calculated.

When actually approaching the branching point A (re-retrieval point), the movable terminal 1 transmits a multi-modal route retrieval request (also referred to as a re-retrieval-point-use multi-modal route retrieval request) to the center 2. At this time, it is known that due to the delay of the corresponding train, the user can reach the merging point B from the branching point by vehicle earlier than by train. As a result, the center 2 transmits the new center route (also referred to as the re-retrieval-point-use center route) which continues traveling up to the merging point B by vehicle. Thus, the user of the movable terminal 1 can arrive at the merging point B by vehicle according to this new center route earlier than that by train.

Under the above configuration, when the guidance route is once determined and then presented to the user and the user of the movable terminal 1 is navigated along the guidance route, the multi-modal route retrieval request may be transmitted to the center 2, thereby enabling the flexible change of the guidance route depending on the real-time or actual present change in the travel state of the public transportation. In addition, the multi-modal route retrieval request is transmitted to the center 2 when the movable terminal 1 determines the approach to the re-retrieval point; thus, a possibility of inquiring to the center 2 uselessly in many times can be suppressed.

Third Embodiment

The following describes a third embodiment of the present invention. The present embodiment differs from the second embodiment in three points.

First, when transmitting the multi-modal route retrieval request (i.e., the re-retrieval-point-use multi-modal route retrieval request) at S340 in FIG. 5, the in-terminal controller 16 of the present embodiment adds data of the present guidance route (either the local route or center route). The added data include a route (i.e., pathway) of each route section, transportation means of each route section, a travel time of each route section, and a fee of each route section.

Second, in execution of the multi-modal route distribution process 23e, the in-center controller 23 transmits not only the center route calculated based on receiving the multi-modal route retrieval request, which is transmitted from the movable terminal 1 at S340 of FIG. 5, but also acquires disadvantageous information that is information about the guidance route contained in the multi-modal route retrieval request received from the movable terminal 1.

The disadvantageous information includes a delay time against the travel time calculated for each route section of the guidance route, and a fee for each route section of the guidance route. The delay time is equivalent to an increase in the travel time for each route section of the guidance route specified based on the present travel state of the present public transportation travel database 22c.

Thus, in the multi-modal route distribution process 23e, the in-center controller 23 calculates a travel time for each route section in the guidance route contained in the re-retrieval-point-use multi-modal route retrieval request from the movable terminal 1, based on the present public transportation travel database 22c (in particular, the travel change data). The above delay time is calculated based on the calculated travel time. The calculated delay time is included in the disadvantageous information.

For example, the disadvantageous information may include information on travel time of each of the route sections using the public transportation on the guidance route.

In addition, the disadvantageous information may include information on delay time due to the disruption to the train services in a specific route section in the guidance route against the regular travel state. Such information includes information that a train, which to be used in a route section traveled by train in the guidance route, will arrive at each station with a delay of 15 minutes.

In addition, suppose the case where the guidance route includes a first route section traveled by train and the new center route (i.e., the re-retrieval-point-use center route) calculated by the center multi-modal route retrieval process 23d at this time substitutes a second route section traveled by vehicle for the first route section traveled by train. The travel time of the first route section traveled by train may be included in the disadvantageous information.

Further, regarding a fee of each route section in the guidance route, the disadvantage information may include a difference between a fee calculated by the in-terminal controller 16 in the local multi-modal route retrieval process 16b and a fee calculated by the in-center controller 23 in the center multi-modal route retrieval process 23d. For instance, the information may be information indicating no difference.

Figure 6:
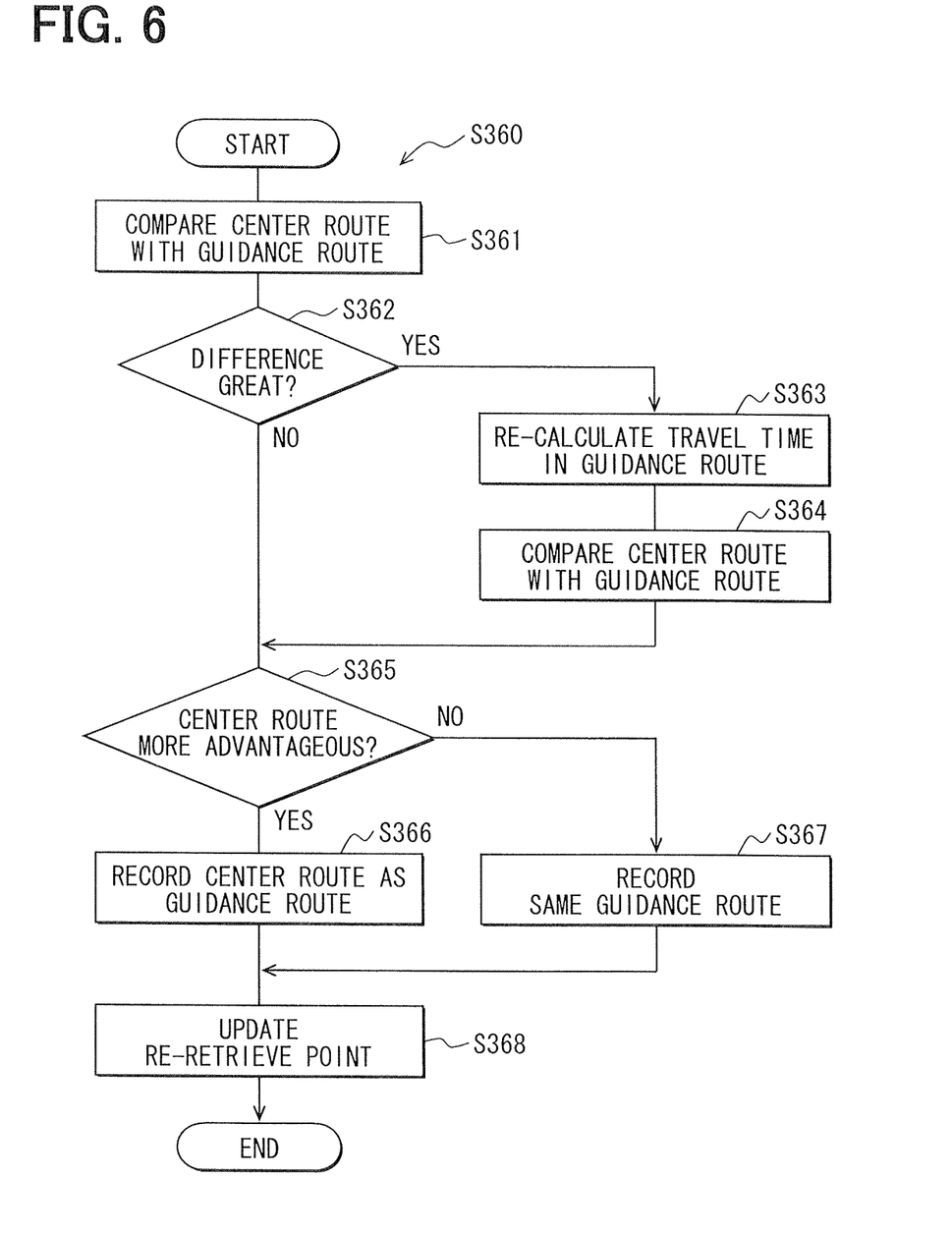
FIG. 6 is a flowchart diagram for illustrating a process executed by an in-terminal controller after receiving a center route according to a third embodiment of the present invention.

Third, the processing at S360, S370, which is executed after the in-terminal controller 16 receives the center route in the in-travel process of FIG. 5 is changed into the processing illustrated in FIG. 6 in the present embodiment.

In specific, when it is determined at S350 in FIG. 5 that the center route as well as the disadvantageous information is received as a response to the multi-modal route retrieval request, the processing proceeds to S361 in FIG. 6.

At S361, the center route (i.e., the re-retrieval-point-use center route) received immediately before is compared with the guidance route. This comparison is made for determining whether the difference of two routes is great. In detail, the comparison is made in respect of a route (i.e., pathway) of each route section, a transportation means (on foot, by vehicle, by train, etc.) of each route section, and a travel time of each route section of the two routes.

Then, at S362, it is determined using the comparison result at S361 whether the difference of the center route and the guidance route is great, based on a predetermined reference.

For instance, it is determined that the difference of the center route and the guidance route is not great in the case of each of the following two predetermined references: (1) the center route and the guidance route are thoroughly identical in respect of the route (i.e., pathway), the transportation means, and the travel time with respect of each route section; and (2) although the center route and the guidance route are thoroughly identical in respect of the route (i.e., pathway) and the transportation means with respect to each route section, they are different in respect of a travel time with respect to at least a part of route sections. Then, it is determined that the difference between the center route and the guidance route is great when two routes are different in respect of a pathway or transportation means of at least a part of route sections. In this case, a travel time and fee are naturally different.

When it is determined that the difference is great, S363 and S364 are executed, thereby advancing the processing to S365. When it is determined that the difference is not great, the processing proceeds to S365 directly.

At S363, the guidance route is re-calculated using the disadvantageous information received from the center 2. It is noted that in this re-calculation, a travel time and fee of each route section of the guidance route are re-calculated without changing the route or pathway and transportation means of each route section of the original guidance route. Such a re-calculation clearly offers information as follows: "when a route section a of the guidance route is traveled by train, as compared with the center route, the delay of 30 minutes arises and the fee is not changed according to the disadvantageous information from the center 2. Therefore, in consideration of the whole route, the fee is maintained unchanged while the delay of 30 minutes arises as compared with the center route."

Then, at S364, the center route is compared with the guidance route by the same method as that at S361 based on the computed result at S363. For instance, the comparison offers clearly the following information: "when the center route is adopted, you arrive at the destination earlier by 10 minutes than adopting the guidance route but need to pay a higher fee by 1000 yen. It is noted that there is a delay of 20 minutes as compared with the travel time resulting from the calculation of the original guidance route anyhow."

At S365, it is determined whether the center route is more advantageous than the guidance route. For instance, the determination reference is as follows. Suppose that the time TC is a travel time required to travel the center route from the present position to the destination. Suppose that the time TL is a travel time required to travel the guidance route from the present position to the destination. Among the time TC and the time TL, if the time TC is smaller, it is determined that the center route is more advantageous. Otherwise, it is determined that the guidance route is more advantageous.

Further, for instance, the determination reference is as follows. Suppose that the fee CC is a fee required to travel the center route from the present position to the destination. Suppose that the fee CL is a fee required to travel the guidance route from the present position to the destination. Among the fee CC and the fee CL, if the fee CC is smaller, it is determined that the center route is more advantageous. Otherwise, it is determined that the guidance route is more advantageous.

Alternatively, suppose that f (T, C) is a monotonically increasing function of the value T, and is a monotonically increasing function of the value C. Such a function includes C+T, for instance. Among f (TC, CC) and f (TL, CL), if the f (TC, CC) is smaller, it is determined that the center route is more advantageous. Otherwise, it is determined that the guidance route is more advantageous.

Additional configuration may be provided as follows. The user of the movable terminal 1 may manipulate the manipulation device 14 to input the determination reference previously. The in-terminal controller 16 may register the inputted determination reference into a flash memory etc. Based on the registered determination reference, it may be determined which is more advantageous between the center route and the guidance route.

For example, the in-terminal controller 16 may present in the display device 13 two or more kinds of selections such as "fee priority" and "time priority", as a determination reference of the advantageousness. The user may manipulate the manipulation device 14 to execute an input which selects one of several selections.

Suppose the case where at S365, among the guidance route and the center route, the guidance route is smaller in the fee while the center route is smaller in the travel time. In such a case, when the user executes the input which selects "fee priority", the in-terminal controller 16 determines that the guidance route is more advantageous. In contrast, when the user executes the input which selects "time priority", the in-terminal controller 16 determines that the center route is more advantageous. Thus, the user inputs the determination reference of the advantageousness; thus, the selection of the route can be made according to the user's sense of values.

Further, at S365, the comparison result at S361 or S364 may be displayed as an image or characters in the display device 13 or notified by speech using a speaker (unshown). The user may determine which is more advantageous based on the comparison result. The comparison result may include the difference in the route, the difference in the transportation means, the difference in the travel time, the difference in the fee, etc. In such a case, the user may input a determination result of the guidance route or the center route, whichever is more advantageous, by using the manipulation device 14. The in-terminal controller 16 may determine which is more advantageous according to the inputted determination result.

Further, even in cases that the user of the movable terminal 1 manipulates the manipulation device 14 to input the determination reference previously, the learning process may be provided which changes the registered determination reference as needed according to the subsequent selection of the user using the manipulation device 14. For example, at S365, the in-terminal controller 16 may select, as a temporary selection result, the center route or the guidance route, whichever is determined to be more advantageous based on the registered determination reference. While notifying the user of the temporary selection result by speech or image, a message may be outputted which inquires whether to accept the temporary selection result to the user. Then, when the user inputs an intention to accept this temporary selection result via the manipulation device 14, the temporary selection result is determined as the final selection. In contrast, when the user inputs an intention to negate this temporary selection result via the manipulation device 14, the selection opposite to the temporary selection result is determined as the final selection. Such a final selection to determine either the center route or the guidance route may be accumulated. When the number of accumulated final selection results exceeds a predetermined number (for example, ten) and the final selection result to selecte one of the routes is greater than a predetermined ratio (for example, 80%), a message which recommends the route selected more than the predetermined ratio may be outputted along with the message, which inquires whether to accept the temporary selection result, to the user. In specific, such a message may be "from your determination up to now, the center route may be recommended. Is it acceptable?"

When it is determined that the center route is more advantageous at S365, the processing proceeds to S366. At S366, the in-terminal controller 16 records the received center route as a new guidance route, thereby replacing the guidance route up to that time with the new guidance route.

When it is determined that the center route is not more advantageous (i.e., the guidance route is more advantageous) at S365, the processing proceeds to S367, where the use of the present guidance route remains unchanged. However, when S363 is executed, the display of the fee and the travel time is corrected according to the calculation result at S363.

Following S366 and S367, at S368, against the guidance route using the same method as that at S165, S170 in FIG. 4, or S370 in FIG. 5, the position of one or more than one re-retrieval point on the guidance route is determined with respect to the new guidance route, and recorded in RAM or flash memory in association with the guidance route.

After S368, the processing returns to S310 in FIG. 5. Then, only when the movable terminal 1 detects an approach to the re-retrieval point, an inquiry of a multi-modal retrieval in the newest travel state is transmitted to the center, again. Adopting the above-mentioned procedure according to the present embodiment results in achieving a travel using a multi-modal route without a useless unnecessary inquiry to the center 2.

In addition, like at S365, 366, 367, it is determined which is more advantageous among the center route (i.e., the re-retrieval-point-use center route) calculated in the center 2 and the present guidance route. More suitable route guidance can be executed by using whichever route is more advantageous as a guidance route.

In the above embodiments, the in-terminal controller 16 may function as a local multi-modal route retrieval section or means by executing S120 in FIG. 3; a determination section or means by executing S130; a local route record section or means by executing S135; a center multi-modal request section or means by executing S140; a center route record section or means by executing S160; a re-retrieval point designation section or means by executing S165, S170; a re-retrieval-point-use multi-modal request section or means by executing S340; and a center route use section or means by executing S360, or S362 to S368.

In addition, the in-center controller 23 may function as a multi-modal route retrieval request reception section or means by executing the multi-modal route retrieval request reception process 23c, a center multi-modal route retrieval section or means by executing the center multi-modal route retrieval process 23d; and a multi-modal route distribution section or means by executing the multi-modal route distribution process 23e.

Other Embodiments

While there have been described specific preferred embodiments of the present invention, it is to be distinctly understood that the present invention is not limited thereto and includes various modes capable of embodying functions of specifics of the present invention.

In the above explanation, the route traveled without using the public transportation includes the route traveled on foot and the route traveled by vehicle. Without need to be limited thereto, the route traveled without using the public transportation may include only the route traveled by vehicle, or may include only the route traveled on foot.

In addition, at S140 in FIG. 3 in the first embodiment, the in-terminal controller 16 transmits the multi-modal route retrieval request to the center 2. Alternatively, the mufti-modal route retrieval request may be accompanied by data on a pathway (or a route) of each route section of the local route calculated at the previous S120. In this case, the in-center controller 23, which receives the multi-modal route retrieval request, determines whether the received local route and the calculated center route is identical when calculating the center route. When they are not identical, data of the center route may be transmitted to the movable terminal 1 like the first embodiment. When they are identical, the data, which indicates that the local route can be used as it is, may be transmitted to the movable terminal 1, while the data of the center route is not transmitted. This can eliminate the need to transmit the data itself of the center route even when it is unnecessary. When the in-terminal controller 16 receives not the data of the center route but the data indicating that the local route can be used as it is, the local route calculated at S120 may be recorded as a guidance route at S135.

Further, in the above second embodiment, while the user of the movable terminal 1 is traveling by following the route guidance of the guidance route, the multi-modal route retrieval request is transmitted to the center 2 when the movable terminal 1 detects the approach to a re-retrieval point. In contrast, during the traveling of the user or the movable terminal 1, in the case other than detecting the approach to the re-retrieval point (for example, when the user requests a re-retrieval via the manipulation device 14 etc.), the multi-modal route retrieval request may be transmitted to the center 2.

That is, while the user of the movable terminal 1 is traveling by following the guidance of the guidance route, the multi-modal route retrieval request may be transmitted to the center 2 at least when the movable terminal 1 detects the approach to a re-retrieval point. This is because of reducing a possibility of executing uselessly frequent multi-modal route retrieval requests. It does not intend to eliminate the execution of the multi-modal route retrieval request in an advantageous case.

Further, in the above third embodiment, the disadvantageous information contains information which indicates an increase (namely, delay time) in the travel time of each route section of the guidance route specified based on the information on the present public transportation travel database 22c against the travel time of each route section of the guidance route calculated by the movable terminal 1. Alternatively, the disadvantageous information may be just the information which enables the movable terminal 1 to calculate a delay time. The travel time of each route section calculated about the guidance route is already obtained by the movable terminal 1. Thus, the disadvantageous information may contain the travel time of each route section of the guidance route specified based on the present public transportation travel database 22c.

Further, in the above embodiments, the center 2 is explained as being a single apparatus or server. Alternatively, the center 2 may be provided as being two or more apparatuses or servers which collaborate to realize the function of the center 2 by intercommunicating with each other.

According to the embodiments, the in-terminal controller 16 and the in-center controller 23 perform the programs to implement the functions. The functions may be replaced by a hardware device having the equivalent functions. Such hardware device may include an FPGA (Field Programmable Gate Array) capable of programming the circuit construction.

It will be obvious to those skilled in the art that various changes may be made in the above-described embodiments of the present invention. However, the scope of the present invention should be determined by the following claims.

What is claimed:

1. A communication system including a movable terminal and a center that intercommunicates with the movable terminal,
the movable terminal comprising:
an in-terminal storage device storing an in-terminal map database containing a road configuration and positions of getting-on-off facilities, at which to get on or off a public transportation, and a regular public transportation travel database containing a regular travel schedule in a regular travel state of the public transportation; and
an in-terminal controller,
the center comprising:
an in-center storage device storing an in-center map database containing a road configuration and positions of getting-on-off facilities, at which to get on or off the public transportation, and a present public transportation database containing the regular travel schedule of the public transportation and a present travel change state against the regular travel schedule; and
an in-center controller,
the in-terminal controller comprising:
a local multi-modal route retrieval section to calculate as an optimal route a local route from a present position to a destination from candidates of route sections traveled by the public transportation and route sections traveled by different transportation other than the public transportation with reference to the in-terminal map database and the regular public transportation travel database;
a determination section to determine whether the local route calculated by the local multi-modal route retrieval section uses the public transportation;
a local route record section to record the local route as a guidance route used for executing route guidance when the determination section determines that the local route does not use the public transportation; and
a center multi-modal request section to transmit a multi-modal route retrieval request containing data on the present position and the destination, to the center when the determination section determines that the local route uses the public transportation,
the in-center controller comprising:
a multi-modal route retrieval request reception section to receive the multi-modal route retrieval request transmitted by the center multi-modal request section of the movable terminal;

a center multi-modal route retrieval section to calculate as an optimal route a center route from the present position to the destination indicated in the multi-modal route retrieval request, from candidates of route sections traveled by the public transportation and route sections traveled by different transportation other than the public transportation with reference to the in-center map database and the present public transportation travel database when the multi-modal route retrieval request reception section receives the multi-modal route retrieval request; and a multi-modal route distribution section to transmit data on the center route calculated by the center multi-modal route retrieval section to the movable terminal, the in-terminal controller further comprising:

a center route record section to record the center route as a guidance route used for executing route guidance upon receiving the data on the center route transmitted by the multi-modal route distribution section as a response to the multi-modal route retrieval request transmitted by the center multi-modal request section of the movable terminal.

2. The communication system according to claim 1, the in-terminal controller further comprising:

a re-retrieval point designation section to designate at least one re-retrieval point on the local route or the center route, whichever is used as the guidance route; and a re-retrieval-point-use center multi-modal request section to determine whether the movable terminal approaches, within a predetermined distance, one of the at least one re-retrieval point on the guidance route during executing the route guidance of the guidance route, and transmit a re-retrieval-point-use multi-modal route retrieval request containing data on a present position and a destination, to the center upon determining that the movable terminal approaches the one of the at least one re-retrieval point, the multi-modal route retrieval request reception section of the in-center controller further receiving the re-retrieval-point-use multi-modal route retrieval request transmitted by the re-retrieval-point-use center multi-modal request section of the movable terminal, the center multi-modal route retrieval section further calculating as an optimal route a re-retrieval-point-use center route from the present position to the destination indicated in the re-retrieval-point-use multi-modal route retrieval request, from candidates of route sections traveled by the public transportation and route sections traveled by different transportation other than the public transportation with reference to the in-terminal map database and the present public transportation travel database when the re-retrieval-point-use multi-modal route retrieval request reception section receives the re-retrieval-point-use multi-modal route retrieval request, the multi-modal route distribution section further transmitting data on the re-retrieval-point-use center route calculated by the center multi-modal route retrieval section to the movable terminal, the in-terminal controller further comprising:

a center route use section to use the re-retrieval-point-use center route as a guidance route upon receiving the data on the re-retrieval-point-use center route transmitted by the multi-modal route distribution section as a response to the re-retrieval-point-use multi-modal route retrieval request transmitted by the re-retrieval-point-use center multi-modal request section.

3. The communication system according to claim 2, wherein:

the center multi-modal route retrieval section of the center designates at least one re-retrieval point on the calculated center route;

the multi-modal route distribution section of the center transmits data on the at least one re-retrieval point designated by the center multi-modal route retrieval section to the movable terminal; and the re-retrieval point designation section of the movable terminal designates as a re-retrieval point on the guidance route the at least one re-retrieval point upon receiving the data on the at least one re-retrieval point transmitted by the multi-modal route distribution section of the center.

4. The communication system according to claim 2, wherein:

the center route use section of the movable terminal executes a determination as to whether the re-retrieval-point-use center route is more advantageous than the guidance route based on at least one of (i) a travel time to travel the re-retrieval-point-use center route from the present position to the destination and a travel time to travel the guidance route from the present position to the destination, (ii) a fee to travel the re-retrieval-point-use center route from the present position to the destination and a fee to travel the guidance route from the present position to the destination, and (iii) a user's selection manipulation;

the center route use section of the movable terminal uses the re-retrieval-point-use center route as a new guidance route when determining that the re-retrieval-point-use center route is more advantageous than the guidance route; and the center route use section continues using the guidance route when determining that the re-retrieval-point-use center route is not more advantageous than the guidance route.

5. The communication system according to claim 4, wherein:

the re-retrieval-point-use center multi-modal request section of the movable terminal transmits the re-retrieval-point-use multi-modal route retrieval request containing data on a route of the guidance route;

the multi-modal route distribution section of the center acquires disadvantageous information at least indicating a travel time in a present state of each route section of the route of the guidance route based on (i) the data on the route of the guidance route contained in the re-retrieval-point-use multi-modal route retrieval request and (ii) the present public transportation travel database;

the multi-modal route distribution section of the center transmits the acquired disadvantageous information to the movable terminal along with the data on the re-retrieval-point-use center route; and the center route use section of the movable terminal re-calculates a travel time to travel each route section of the guidance route using the disadvantageous information transmitted by the multi-modal route distribution section, and determines whether the re-retrieval-point-use center route is more advantageous than the guidance route using the re-calculated travel time.

6. The communication system according to claim 2, wherein:

the guidance route contains a plurality of branching points branching to different routes and a plurality of merging points merging from the different routes; and the re-retrieval point designation section designates a re-retrieval point that is a first branching point branching from the guidance route to a first different route that merges into the guidance route at a first merging point, the first different route having a cost greater than a cost of the guidance route from the branching point to the merging point by less than a predetermined value.

7. The communication system according to claim 6, wherein the first different route is enabled to be traveled by the public transportation from the first branching point to the first merging point, the first branching point and the first merging point being getting-on-off facilities where to get on or off the public transportation.

8. A movable terminal intercommunicating with a center, the center including an in-center map database containing a road configuration and positions of getting-on-off facilities, at which to get on or off a public transportation, and a present public transportation travel database containing a regular travel schedule in a regular travel state of the public transportation and a present travel change state against the regular travel schedule, the movable terminal comprising:

an in-terminal storage device storing an in-terminal map database containing a road configuration and positions of getting-on-off facilities, at which to get on or off the public transportation, and a regular public transportation travel database containing a travel schedule in a regular travel state of the public transportation; and an in-terminal controller, the in-terminal controller comprising:

a local multi-modal route retrieval section to calculate as an optimal route a local route from a present position to a destination from candidates of route sections traveled by the public transportation and route sections traveled by different transportation other than the public transportation with reference to the in-terminal map database and the regular public transportation travel database;

a determination section to determine whether the local route calculated by the local multi-modal route retrieval section uses the public transportation;

a local route record section to record the local route as a guidance route used for executing route guidance when the determination section determines that the local route does not use the public transportation;

a center multi-modal request section to transmit a multi-modal route retrieval request containing data on the present position and the destination, to the center when the determination section determines that the local route uses the public transportation; and a center route record section to record the center route as a guidance route used for executing route guidance upon receiving data on a center route transmitted from the center, the center route being calculated in the center as an optimal route from the present position to the destination indicated in the multi-modal route retrieval request, from candidates containing route sections traveled by the public transportation and route sections traveled by different transportation other than the public transportation with reference to the in-center map database and the present public transportation travel database.

* * * * *